UNITED STATES PATENT OFFICE.

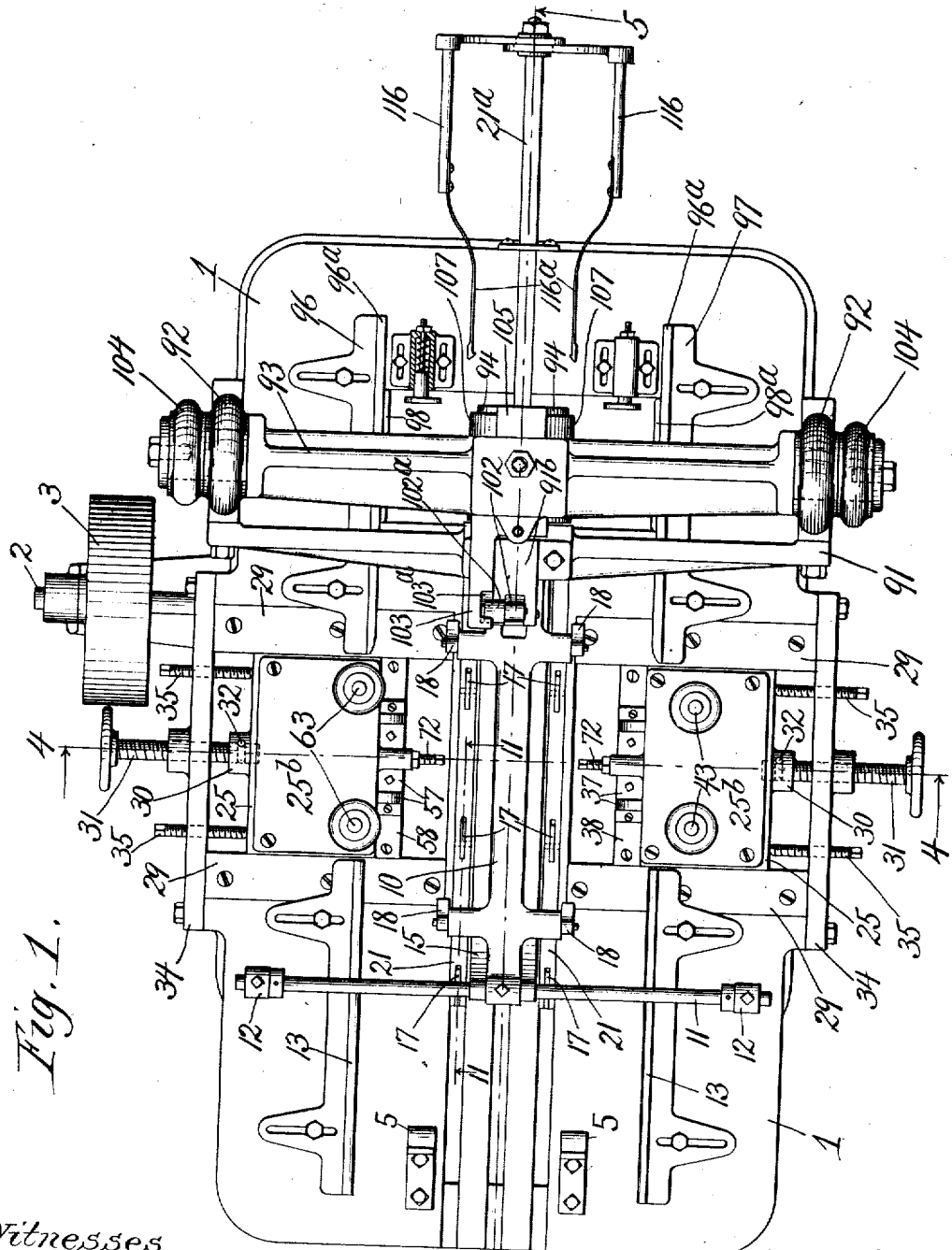

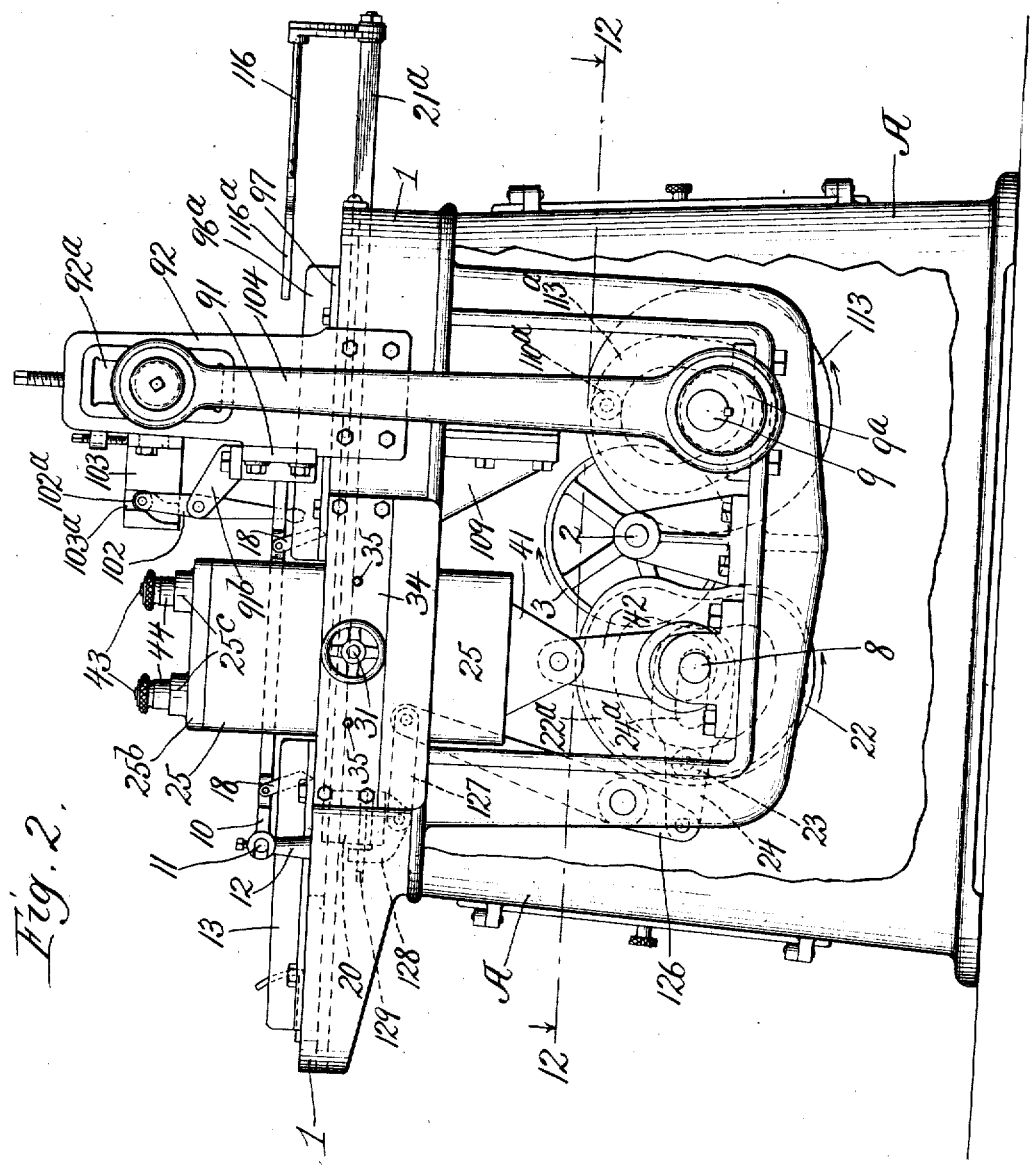

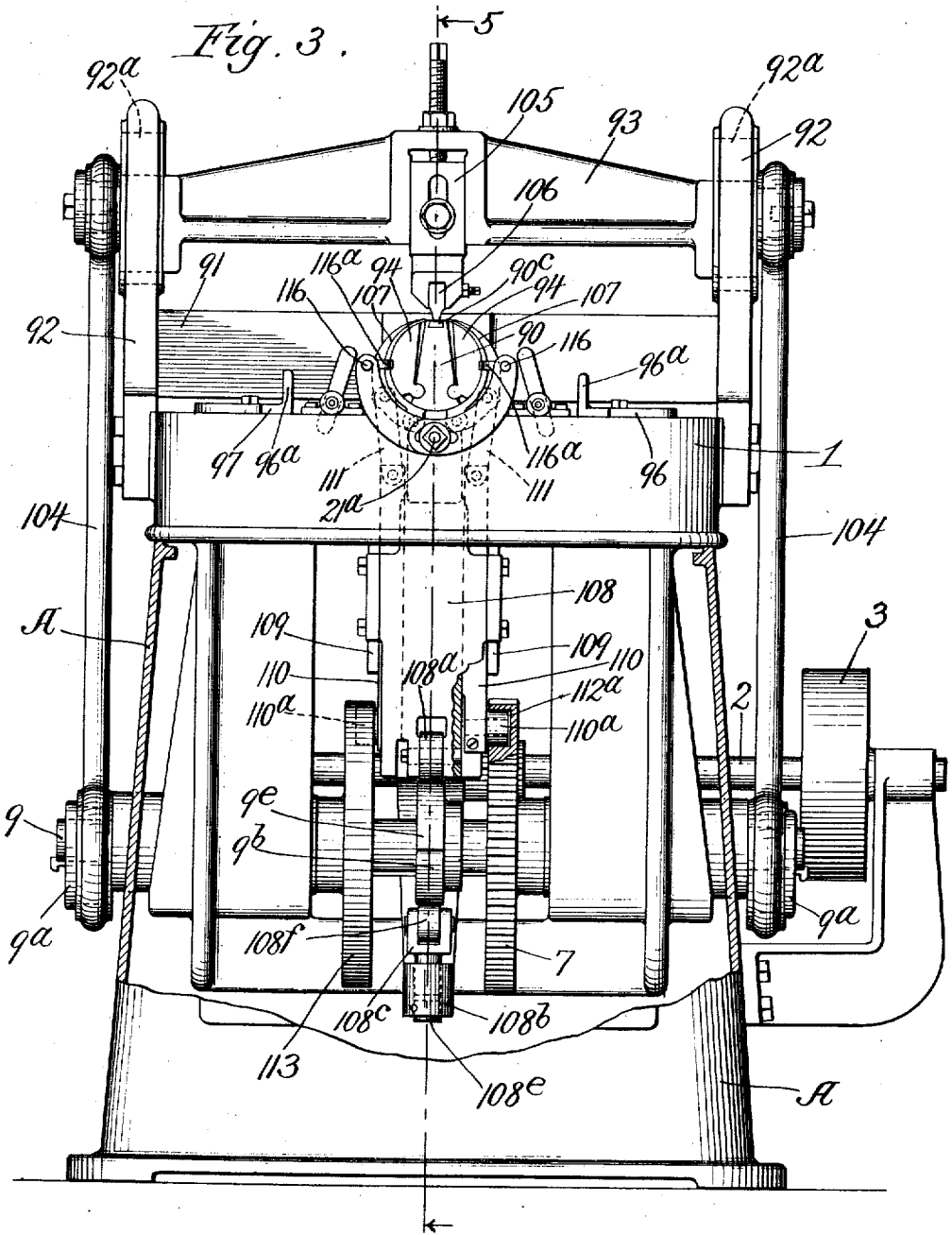

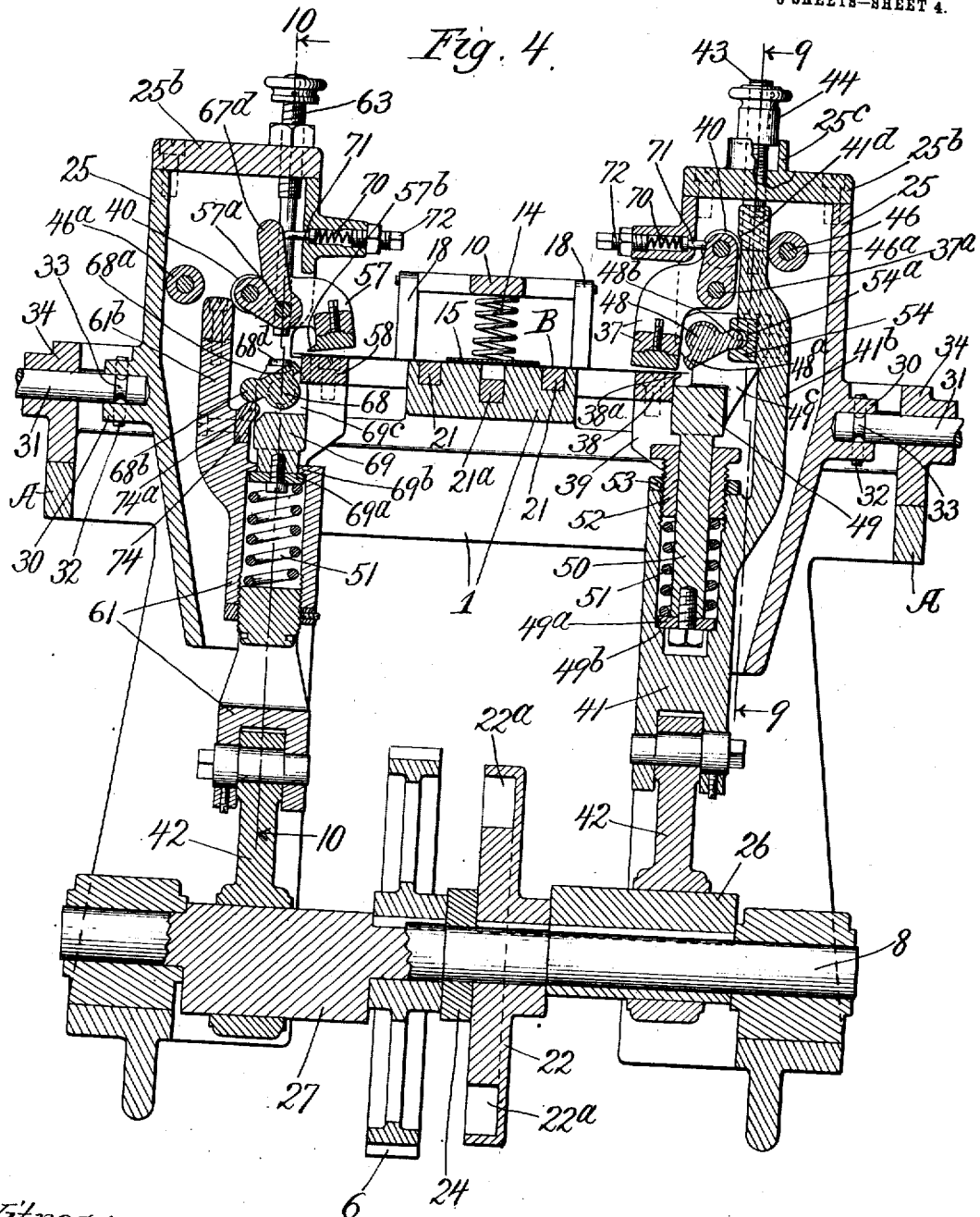

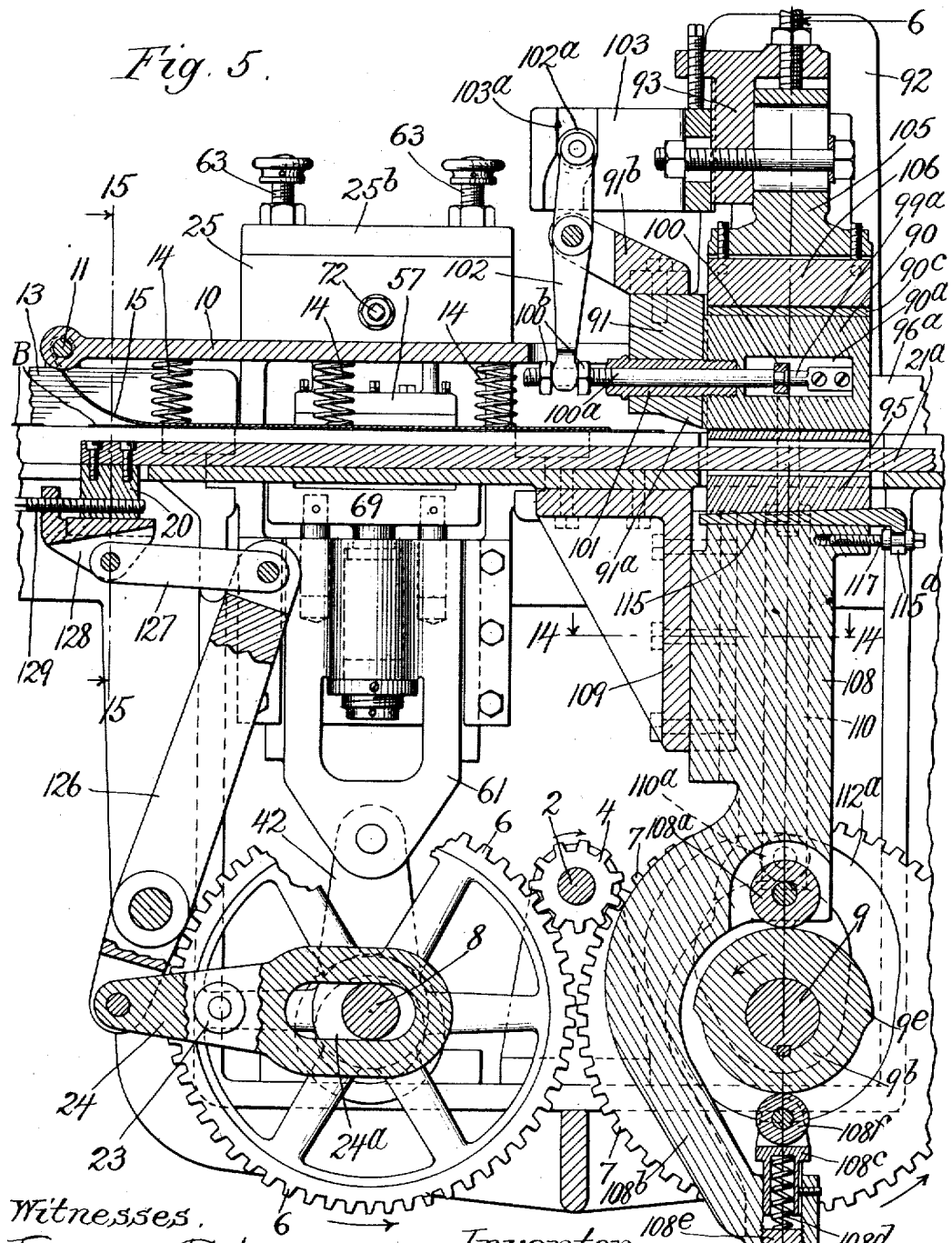

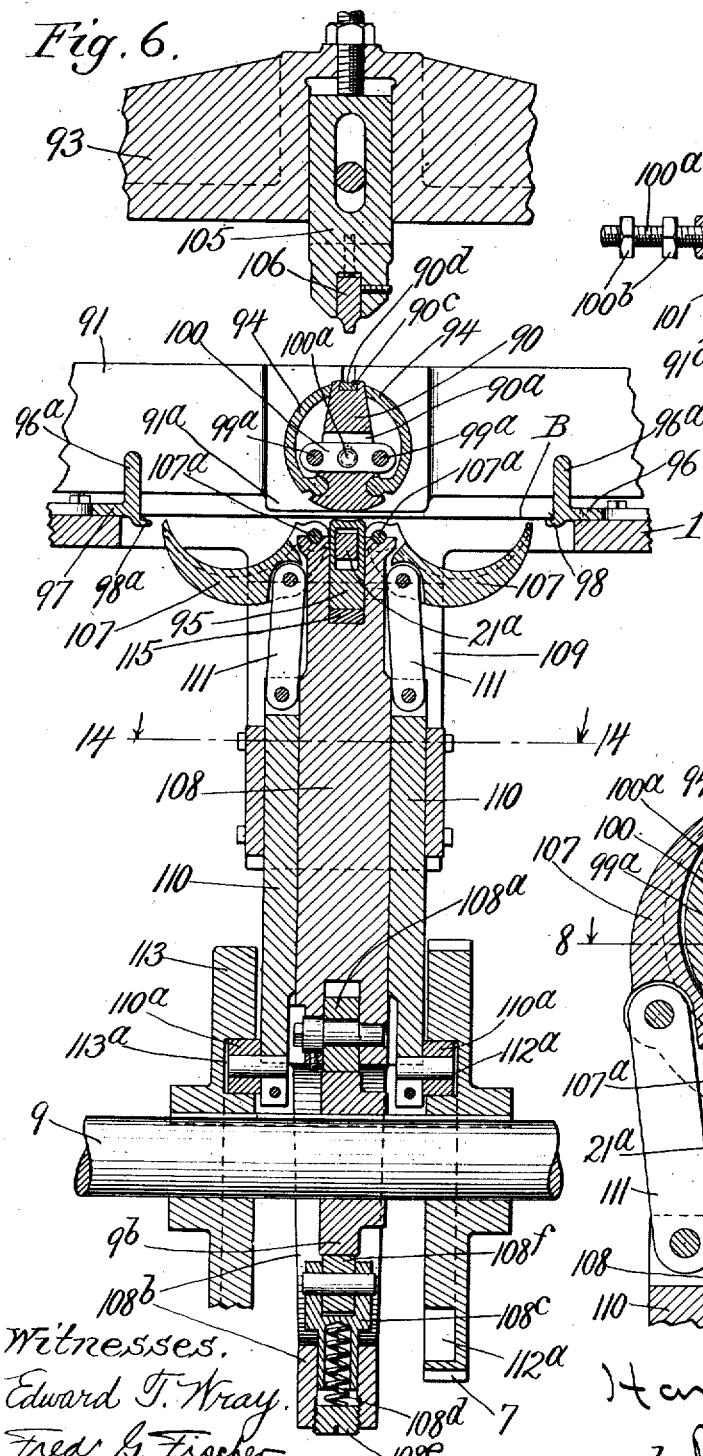
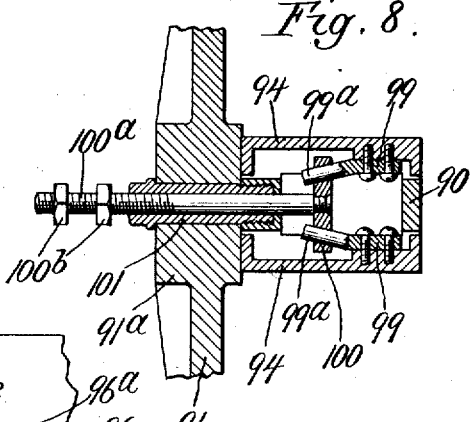
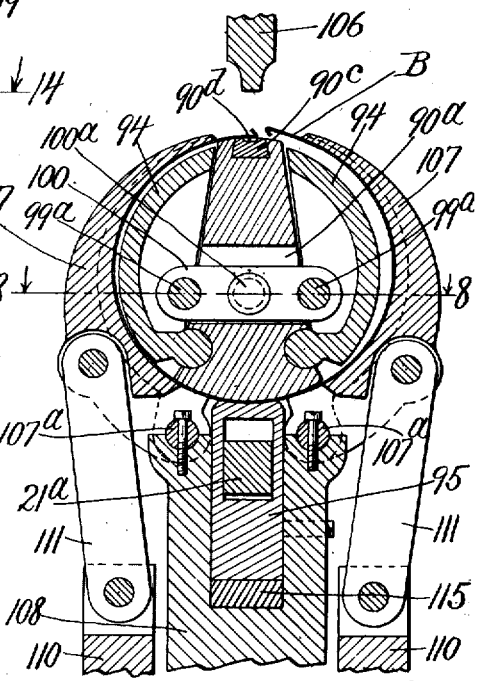

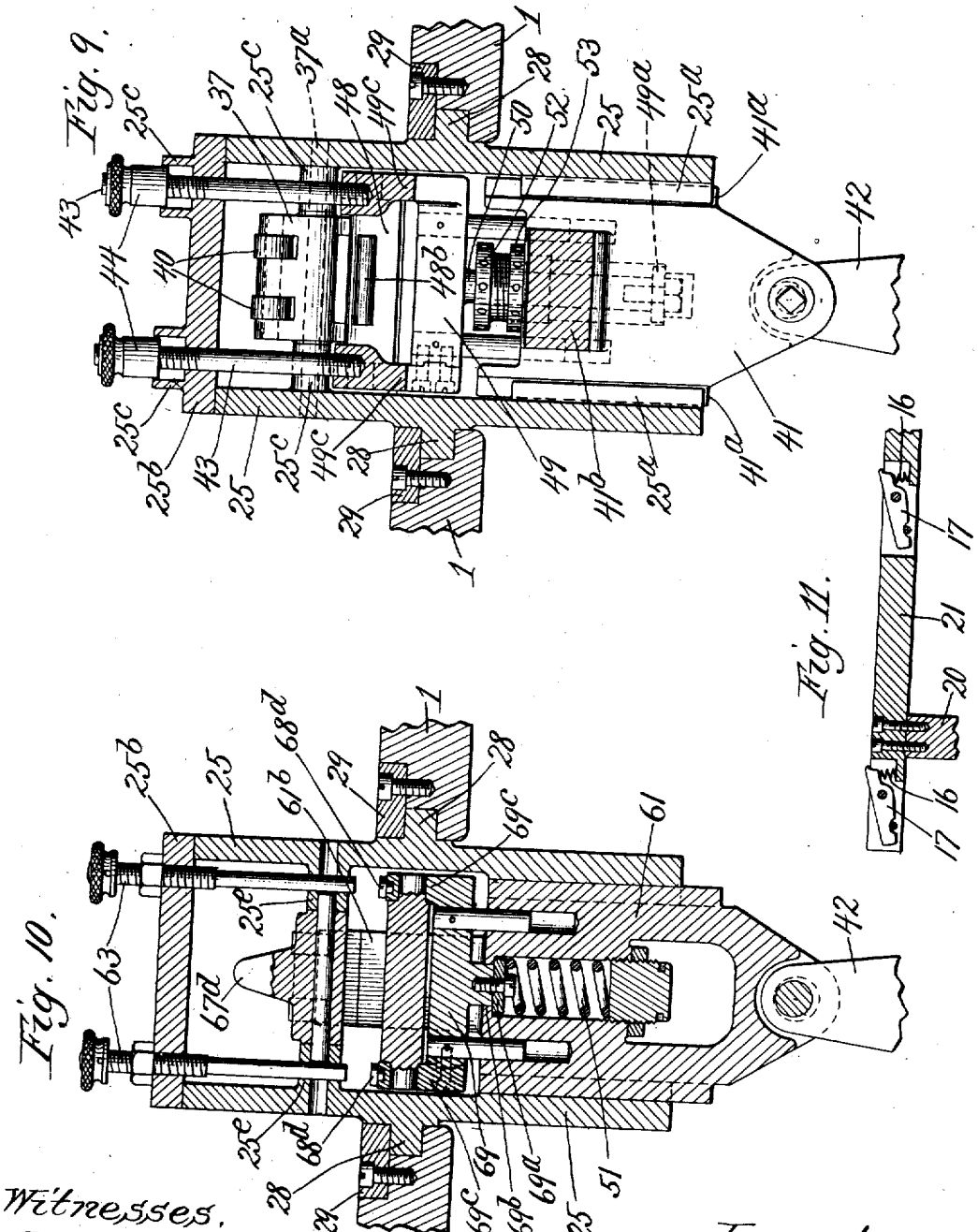

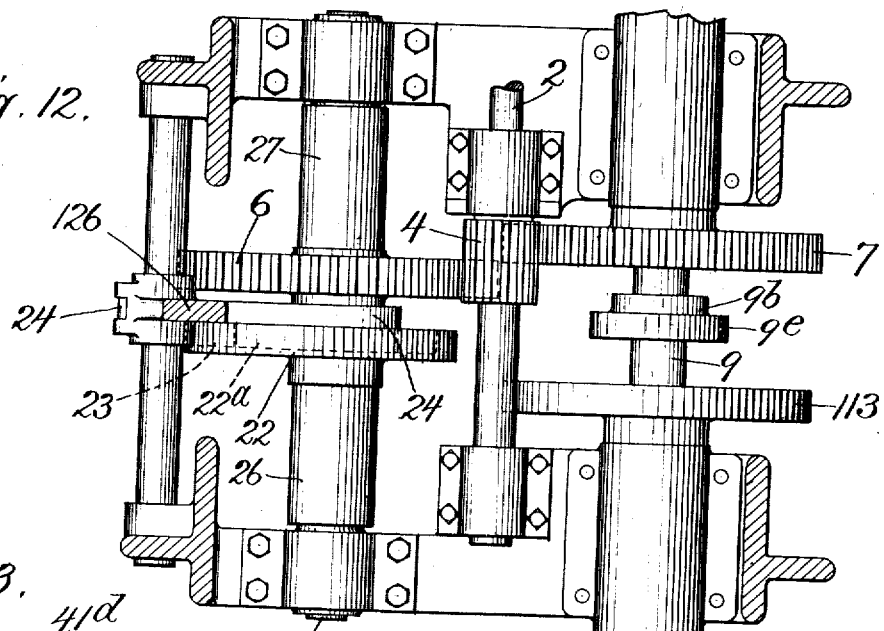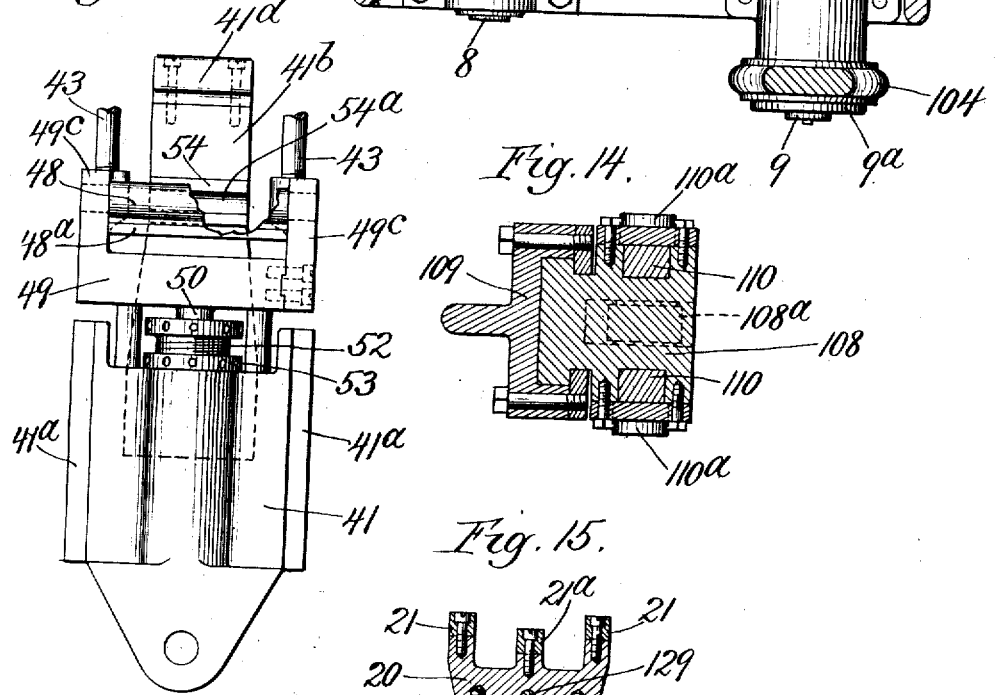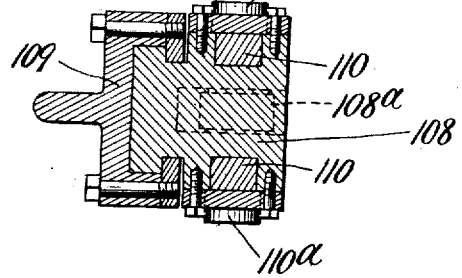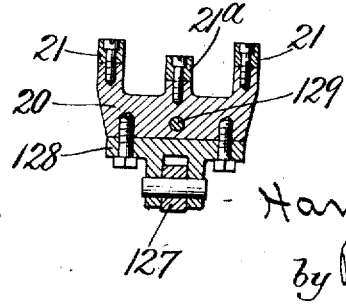

HARRY C. H. WALSH, OF CHICAGO, ILLINOIS, ASSIGNOR TO CONSOLIDATED PRESS AND TOOL COMPANY, OF CHICAGO, ILLINOIS, A CORPORATION OF ILLINOIS.

CAN-BODY-SIDE-SEAMING MACHINE.

No. 845,988.  Specification of Letters Patent.  Patented March 5, 1907.

Application filed September 12, 1904. Serial No. 224,176.

*To all whom it may concern:*

Be it known that I, HARRY C. H. WALSH, a citizen of the United States, residing at Chicago, in the county of Cook and State of Illinois, have invented new and useful Improvements in Can-Body-Side-Seaming Machines, of which the following is a specification, reference being had to the accompanying drawings, forming a part thereof.

This invention relates to the formation of can-bodies, and particularly to an automatic performance of the operations by which the sheet of metal for making such bodies is handled automatically through the several steps involved in forming and completing the longitudinal side seam and delivering the completed body.

It consists of the features of construction set out in the claims.

In the drawings, Figure 1 is a top plan of a machine involving this invention. Fig. 2 is a side elevation having part of the inclosing casing broken out to disclose the interior structure. Fig. 3 is a delivery end elevation with the inclosing casing similarly broken away. Fig. 4 is a section at the line 4 4 on Fig. 1. Fig. 5 is a section at the line 5 5 on Figs. 1 and 3. Fig. 6 is a section at the line 6 6 on Fig. 5. Fig. 7 is a transverse section of the horn and folding devices at the same plane as Fig. 6, showing the parts nearly folded up and on a larger scale than Fig. 6. Fig. 8 is a detail section at the line 8 8 on Fig. 7. Fig. 9 is a section at the line 9 9 on Fig. 4. Fig. 10 is a section at the line 10 10 on Fig. 4. Fig. 11 is a detail section at the line 11 11 on Fig. 1. Fig. 12 is a section at the line 12 12 on Fig. 2. Fig. 13 is an inner side elevation of a portion of operating parts of the right-hand edger removed from the carriers. Fig. 14 is a section at the line 14 14 on Figs. 5 and 6. Fig. 15 is a detail section at the line 15 15 on Fig. 5.

In this machine the sheet for forming a can-body when fed into the machine is taken by a step-by-step-feeding device and advanced through the machine by steps, halting after each step for some process to be performed on it, a new sheet being received at each step and following behind the preceding, so that at each step after the machine is fully charged a completed can-body is delivered, every one of the several processes necessary to the complete operation being performed upon some one of the sheets or blanks contained in the machine at the interval following each step of feed movement or in such feeding movement. The parts which act directly upon the blank for performing these several processes are in general exposed above the table on which the blank is lodged, and the power-communicating parts of the mechanism are in general below that table.

The machine preferably and as represented in the drawings comprises a cabinet standard or frame A, which incloses the power-communicating mechanisms below the level of the table 1, which forms the top of what is called the cabinet "standard" or "frame" A. In this standard there is journaled a driving-shaft 2, to which power is communicated in any convenient manner, as by a belt over the pulley 3 on said shaft 2. A broad pinion 4 on the shaft 2 meshes with both the equal gear-wheels 6 and 7 (the wheel 7 being also a cam-wheel) on parallel shafts 8 and 9, also extending transversely and journaled in the stand-ard-frame. The two shafts 8 and 9 are thus revolved synchronously in the same direction, and from these two shafts all the process-performing movements of the mechanism are derived and are perfectly timed with respect to each other by the synchronous movement of said shafts. On the top of the table there are mounted curved guides 5 5 for the forward edge of the blank, which cause it to lodge on the feed-bars in advance of the forward-feeding teeth 17, hereinafter mentioned, and for stopping the blank laterally there are also mounted on the table lateral gages 13 13, adjustable to accommodate the width of the blank, and outside these gages are upstanding lugs 12 12, in which there is mounted a rod 11, on which is mounted one end of a spring-presser for holding the blanks to the table and within the grasp of the feeding devices. This presser comprises a skeleton frame 10, mounted, as stated, at the forward end on the rod 11 and having several (as illustrated, three) springs 14 14 14 distributed in its length under the middle bar of the skeleton frame and interposed between the same and a sheet-metal foot piece or shoe 15, which is curved up at the forward end and secured to the skeleton frame and extends rearward past the edging devices hereinafter described. The presser-frame 10 is held at its rear end by attachment to the cross-head 91, hereinafter described, which pertains to the folding and seam-clenching devices. Detent-dogs 18 18 are pivoted to the skeleton frame 10 at opposite sides and at suitable intervals longitudinally to engage the sheets to prevent their retraction by the friction of the feed-bars or of their feed-dogs as they are retracted under the sheet at each action. These dogs accomplish this function of preventing retraction of the blanks by being slightly inclined onward as they extend downward from their pivots to their acute points for engaging the upper surface of the sheets. The feeding devices comprise a cross-head 20, reciprocated for giving the feeding movement, as hereinafter described, and having connected to it rigidly two laterally-situated feed-bars 21 21 and an intermediate guide-bar 21ª for carrying other feeding devices at the delivery side, as hereinafter explained, all of said bars being lodged in longitudinal slots in the table. Said lateral feed-bars have spring-protruded feeding-dogs 17 17 lodged in the bars and adapted to disappear below their surface as the bars are retracted and the teeth drawn back under the sheet, being held up protruded in the feeding movement for engagement with the sheets by springs 16 16. (See Fig. 11.) These feeding-dogs are distributed in the length of the feed-bars at intervals corresponding to the feed stroke and sufficient to accommodate between consecutive teeth a blank for the longest body to be handled in the machine. The feeding movement of the feed-bars is derived from a cam 22, having a face cam-groove 22ª, in which is engaged an abutment-roll 23, mounted on the side of a slide-link 24, which is guided on the shaft 8 for longitudinal reciprocation by means of the slot 24ª in said slide-link, the forward end of the slide-link being pivotally connected to the lower end of a lever 126, fulcrumed on the frame above but relatively near its said lower end, the longer arm of the lever projecting upward and having its upward end pivotally connected by the link 127 to the cross-bar 20, said connection being made by means of a clip 128, which is engaged with the cross-bar in a longitudinal slot for adjustment and secured at adjusted position by the adjusting-screw 129. (See Figs. 5 and 15.) This adjustable connection, it will be seen, constitutes means for setting the feed-bars, so that the feeding-dogs shall at the completion of their feeding stroke leave the blank in exactly the right position for action of the several devices which are to operate upon it in the several processes of the whole operation.

It will be understood that the form of the cam-groove 22ª is such as to give the feeding devices their proper feeding stroke in a predetermined relatively short portion of the rotation of the shaft 8, the groove being concentric about the shaft during the greater part of its source for holding the blanks stationary during the processes which are performed upon them. The first of these processes is edging or flanging the edges of the sheets preparatory to making the interlocking side seam. For this process there are mounted in the frame and extend up through the table, suitably apertured for that purpose at opposite sides of the path of the blank along the table, the right and left edgers, which are shown in detail in Fig. 4 and in Figs. 9 and 10. These edgers each comprise a casing or carrier 25 and edging or flanging mechanism mounted in these carriers, respectively, the carriers being identical in construction, but the contained mechanisms being different for turning the flanges at the opposite edges of the blanks toward the opposite sides. These mechanisms derive action from eccentrics 26 and 27 on the shaft 8, and the entire edgers, including the carriers 25 and their contained and carried mechanisms, are made adjustable laterally—that is, transversely with respect to the path of the blank through the machine—to accommodate the width of the blanks to be operated upon corresponding to the circumference of the can-bodies to be formed. For the purpose of such lateral adjustment the carriers 25 are provided with guide-flanges 28 28 at their opposite sides, which are engaged in corresponding ways formed in the front and rear edges of the table-apertures through which the edgers protrude, said ways being preferably made, as seen in Figs. 9 and 10, by rabbeting the edges of the table-apertures and securing retaining plates or lips 29 29, forming the upper guard-flange of the slot or way which accommodates the guide-flanges 28. For thus adjusting the edgers transversely the carriers 25 have each at their outer side a socketed boss 30, in which a feed-screw 31 is rotatably engaged by a pin 32 taking through a groove 33. The thread of the screw engages a threaded boss on a bearing-plate 34 on the frame A. Stop-screws 35 35 are set through the bearing-plate 34 against the carriers and may be tightened to make them rigid in adjusted position.

The edging or flanging mechanism of the right-hand edger will first be described. It comprises an upper jaw 37, which is pivoted at 37ª on inwardly-protruding bosses 25° and protrudes from the inner side thereof, overhanging the lateral portion of the path of the blank. A spring 70, tensioned by a screw 72 and acting through a plunger 71 against the jaw above its fulcrum, tends to hold it normally swung up off the blank, as in Fig. 4. A lower jaw 38 is mounted rigidly on short brackets 39 39, projecting from the inner edges of the carrier 25, the upper surface of said lower jaw being flush with the upper surface of the table on which the blank is lodged and held by the presser. The upper jaw 37 has mounted in its upper edge above its fulcrum antifriction-rolls 40 40, which protrude at their outer side beyond the corresponding surface of the jaw, so as to be encountered by means hereinafter described for carrying the upper end of said jaw inward, whereby it is rocked over its fulcrum $37^a$ and its operating-face is depressed and brought parallel with the upper face of the fixed jaw for gripping the blank between said two faces. The upper jaw is operated for the gripping action above described by the means which also operates the flanging devices. This means consists of a vertically-reciprocating plunger 41, connected at its lower end by the link or pitman 42 with the eccentric 26. This plunger is guided vertically in the carrier 25 by means of its flanges $41^a$ engaging in the guideways $25^a$ of the carrier at the lower part. The upper terminal lug $41^b$ of the plunger 41 has on its inner face the slight upraise or protrusion $41^d$, (see Fig. 4,) which at the extreme upper position of the plunger is above the antifriction-rolls 40 40, respectively, and as the plunger descends encounters said rolls, and thereby rocks the jaw 37 over its fulcrum, as described for the clamping movement. In order to reinforce the carrier and relieve its guideways of the strain imposed by this clamping action, there is provided a reinforcing-rod 46, which extends across the carrier at the outer side of the upper end and carries antifriction-rolls $46^a$ opposite the antifriction-rolls 40 40 of the jaw 37. (See Fig. 4.) In the carrier 25 there is mounted a chair 49 for the flanging-rocker 48. This chair has a spindle 50, which extends into a socket in the stem of the plunger 41, wherein it is subject to the action of a coil-spring 51, coiled around said stem within the socket and stopped at one end by the terminal disk $49^a$, secured to the end of the stem and extending flangewise circumferentially beyond said stem, and at the other end by the tension-adjusting stop-sleeve 52, which is screwed into the upper end of the socket and secured by a jam-nut 53. The chair 49 is thus held yieldingly against upward movement with respect to the plunger 41, and it is positively stopped in the direction of the thrust of the spring by the terminal disk $49^a$, reaching the stop-shoulder $49^b$ at the lower end of the socket. The chair 49 is further guided for vertical movement by the rods 43 43, screwed into its upper end and extending out through the top plate $25^b$ of the carrier 25, their protruding ends being threaded for stop-nuts 44 44, which play to the bottom of the sockets provided for them in the bosses $25^c$ on the top plate $25^b$ and serve thereby to stop the movement of the chair in the descent of the carrier, for a purpose hereinafter explained. The flanging-rocker is fulcrumed in the upwardly-extending wings $49^c$ of the chair 49 at a position such that its lower flange-turning edge $48^a$ overhangs the space into which the edge of the blank B protrudes for forming the flange when the plunger is at the highest position. This rocker at its outer side has a semicylindrical terminal lip $48^b$, which engages a corresponding groove or seat $54^a$ in a controlling-bar 54, which is bolted fast to the plunger 41 and extends longitudinally between the wings $49^c$ of the chair 49. The fixed jaw 38 has a lip $38^a$ at the outer side, which overhangs the upper surface of the body of the chair 49, and it is beyond the edge of this lip that the blank B protrudes to form the flange, the lip being at its upper face flush with and continuing the upper surface of the jaw and its lower surface making an acute angle with its upper surface, but blunted at the angle to avoid cutting the metal, the angle in question being that at which it is found desirable to fold the flange for proper interlocking of the flanges to form the seam, as hereinafter described. At the position of rest (shown in Fig. 4)—that is, when the plunger 41 is at its highest position—the upper surface of the flanging-lip $48^a$ of the flanging-rocker is inclined to the plane of the blank at an angle somewhat less acute than the angle of the lip $38^a$ for reasons which will appear as the action of the flanging-rocker is considered. The operation of this device is that when at the proper time in the rotation of the shaft 8 the eccentric 26 draws downward the plunger 41 the first portion of said downward movement causes the jaw 37 to be rocked for clamping the blank between the two jaws, such rocking being caused, as described, by the encounter of the upraise $41^d$ of the plunger against the rolls 40 40 at the upper end of the jaw 37. The blank being thus gripped firmly with its margin projecting beyond the lip for forming the flange, the further downward movement of the plunger causes the edge $48^a$ of the rocker 48, encountering the overhanging marginal portion of the blank, to fold it down at right angles to the plane of gripping-faces of the jaws while the said edge is passing that plane. In this action the chair 49 is carried bodily with the plunger, and the spring 51 is of sufficient stiffness to resist any material upward yielding of the chair with respect to the plunger, so that the folding action described is substantially positively performed. The adjusting-nuts 44 are set with their lower end at such distance from the bottom of the pocket $25^c$, in which they are accommodated, or from plane of the upper surface of the cap $25^b$, to permit the requisite amount of descending movement before the chair is stopped. When it is thus stopped, the further descending movement of the plunger 49, carrying downward the outer lip 48ʰ of the rocker 48, rocks the latter about its fulcrum in the chair, carrying the flanging-lip 48ᵃ relatively upward and inward and from the position to which it has been allowed to descend before the stop-nuts 44 encountered their stop. Such rocking movement carries the upper face of said lip inward against the downturned flange and presses said flange against the inclined under face of the lip 38ᵃ, setting the flange thus at an acute angle to the lower surface of the blank. The continued rotation of the shaft 8 past the point at which the plunger is at the lowest position carrying the plunger upward, releases the blank from the grip of the jaws and the flange from the grip of the rocker, so that the blank is free to be moved onward by the next feeding movement, while the shaft continues its rotation on around to the starting-point during such feeding movement.

The left-hand edger is constructed for turning the flange upward instead of downward on the blank and is modified accordingly from the construction above described. In this left-hand edger the plunger 61 is mounted for vertical reciprocation in the carrier 25 in the same manner as above described with respect to the plunger 41 in the other carrier and is operated for vertical reciprocation in a similar way by a link or pitman 42, which connects it with the eccentric 27. The two eccentrics 26 and 27 have their eccentric centers at diametrically opposite positions with respect to the axis of the shaft 8, so that when one plunger is at its highest position the other is at its lowest position, and the operative movements of the plunger 61 are performed in its upward movement for turning the flange upward as those of the plunger 41 are performed in the downward movement for turning the flange downward. The jaw 57, corresponding to the jaw 37 of the other edger, is fulcrumed at 57ᵃ in the carrier 25, said carrier having its side walls provided with inwardly-extending bosses 25ᵉ to afford pivot-bearing for the jaw. (See Fig. 10.) This jaw has at its inner side antifriction-rolls 40 40 for encounter by an upwardly-extending wing 61ᵇ of the plunger 61 to rock the jaw over its fulcrum and cause it to grip the blank in the first upward movement of the plunger, and the jaw has an upwardly-extending tongue 67ᵈ, which is exposed to the action of a spring 70 through the plunger 71 for retracting the jaw. The lower jaw 58 at the left-hand side of the table has its lateral edge at right angles to the upper face; but the upper jaw 57 has upon the inner side a lip 57ᵇ, corresponding to the lip 38ᵃ of the lower jaw at the opposite side and having its upper surface at a similarly acute angle to the lower face and similarly blunted. The rocker 68 in this left-hand edger is fulcrumed in the wings 69ᶜ of the chair 69 and has at the outer side its semicylindrical bead or lip 68ᵇ situated so that it is lodged upon the semicylindrical lip 74ᵃ of the controlling-bar 74, mounted on the plunger 61. The spring 51 in this edger operates to yieldingly thrust the chair 69 upward relatively to the plunger, and such upward movement is stopped by the stop-disk 69ᵃ, secured to the lower end of the plunger-stem, encountering the shoulder 69ᵇ at the upper end of the socket. The adjustable stop-rods 63 63 are threaded at the upper part and screw through the top plate 25ᵇ of the carrier 25. They are reduced below a limited threaded portion and extend down through the pivot-bosses 25ᵉ, so that their lower ends overhang the bearings in the chair 69 of the flanging-rocker 68. In the upper side of said bearings there are set two contact-buttons 68ᵈ for making the contact with the lower end of the stop-rods when the plunger has been lifted to carry the flanging-lip 68ᵃ of the rocker up past the lip 57ᵇ of the upper jaw for folding the marginal portion of the blank upward in the flange at right angles to its surface, and when such encounter has occurred the continued upward movement of the carrier—the chair and rocker being stopped against further upward movement—causes the rocker, actuated at its outwardly-extending semicylindrical bead or lip 68ᵇ by the lip 74ᵃ of the controlling-bar 74, to be rocked about its fulcrum, carrying its flanging-lip inward and down and folding the flange, which has been turned upward by the upward movement, down inward about the lip 57ᵇ of the upper jaw at an angle determined by the corresponding angle of said lip and of the under face of the flanging-lip of the rocker, being substantially the same angle as that at which the opposite flange is turned to the under surface of the blank. The continued rotation of the shaft 8 releases the blank from the gripping-jaws and the flange from the grip of the rocker upon the lip of the upper jaw, so that the blank is free at this side at the same time that it becomes free at the other side for the next onward feeding movement.

The next step feed movement of the blank taking it out from the edgers brings it into position intermediate the edgers and the horn and folders, so that at the second step no action is performed upon the blank; but a second blank being brought in to the edgers is subjected to their action, as above described, while the first blank rests idly intermediate the edgers and the horn. The third step movement carries the first blank on which the flanges have been turned by the edgers into the third position, where it lies extended above the folders and between the horn and the gripper, by which, as hereinafter explained, it is clamped against the horn at the under side while being folded.

The construction of the horn and folders and the operating devices for folding and interlocking the seam will now be explained.

The horn comprises a rigid middle portion or back piece 90, which is carried rigidly by the cross-bar 91, which extends from side to side across the machine above the bed, being itself carried by being bolted rigidly at the ends to the uprights 92 92, which are bolted at their lower ends to the opposite sides of the table 1. The horn back piece 90 at its lower side extends to within a very short distance—slightly more only than the thickness of the metal to be operated upon—of the plane of the upper surface of the table on which the blank is advanced, and the cross-bar 91 at its forward side has a boss 91$^a$, (see Fig. 5,) which is sloped down from a distance above said plane to the level of the lower side of the horn for insuring the entrance of the blank under the horn. To the back piece 90 of the horn the segmental cylindrical wings 94 94 are hinged near the lower part of the back and at the lower edge of said wings. (See Figs. 6 and 7.) The hinge connection and dimensions of the wings permit them to collapse inward and swing outward sufficiently for relief from the body of the can after it has been engaged at the seam to permit the can to be withdrawn. To support the lateral edges of the blank on which the flanges have been formed as the blank enters under the horn and over the clamp 95, bracket-guides 96 97 are secured upon the upper side of the table, and said brackets are adjusted laterally with upstanding guide-flanges 96$^a$, separated by the distance necessary to accurately accommodate the blank with its flanged edges. These brackets are formed with the ledges 98 98$^a$, the former having its upper face in the plane of the blank-supporting table or under surface of the blank and the latter being enough lower to hold the body of the blank at the proper plane in view of the fact that the underturned flange lodges upon said ledge. (See Fig. 6.) At this stage of the process the wings 94 94 of the horn are held at position shown in Fig. 6, so that the horn is collapsed to something less than the inner diameter of the can. For holding the wings in this position there is bolted to each of them on the inner side a plate 99, having an oblique cam-finger 99$^a$, trending inward—that is, toward the plane of the vertical diameter—and the back piece 90 is apertured at 90$^a$ to admit a cross-head 100, carried on a stem 100$^a$, which extends longitudinally through the back piece toward the forward end and on forward through the hollow bolt or sleeve 101, which secures the back piece 90 to the cross-bar 91. The stem 100$^a$, emerging from the forward end of the bearing-sleeve or hollow bolt 101, is engaged by a lever 102, fulcrumed on a bracket 91$^b$, mounted on the cross-bar 91, said engagement being effected adjustably between the nuts 100$^b$ 100$^b$ on the end of the stem 100$^a$, which is threaded for that purpose. The upper end of the lever 102 at the opposite side of its fulcrum from its engagement with the stem 100$^a$ has an abutment-roll 102$^a$, which travels in a cam-groove 103$^a$, formed in a bracket-arm 103, rigid with and jutting forwardly from the forward side of the sliding cross-head 93. This cross-head is guided vertically by the engagement of its ends in the parallel-sided guideways 92$^a$, formed in the uprights 92 at the upper part, and is connected outside said uprights by the links 104 104 with eccentrics 9$^a$, keyed fast on the ends of the shaft 9 outside its bearings in the cabinet-frame. The sliding cross-head 93 carries adjustably but rigidly mounted upon it at the middle point in its width, in position to overhang the upper edge of the back piece 90 of the horn, a clencher-head 105, which carries in its lower end a suitable terminal vertically-adjustable clenching-punch 106 for clenching together the interlocked flanges of the can-body to form the side seam, and said upper side of the back piece 90 of the horn carries a corresponding clenching-die 90$^c$ to coöperate with the punch 106 in clenching the seam.

For gripping the blank to the back or under side of the back piece 90 and for carrying the folders by which the blank is to be folded about the horn there is provided a plunger 108, which is mounted for vertical reciprocation on a bracket 109 on the frame, which has at the upper end the gripper-jaw 95 and at its lower end an antifriction-roll 108$^a$, by which it is stepped upon the upper side of a cam 9$^b$ on the shaft 9, which as the shaft rotates thrusts the plunger up and permits it to descend at diametrically opposite points, at which the diameter of the cam changes between portions of lesser and greater radius. In the opposite sides of the plunger 108 there are retained and guided vertically plungers 110 110, whose upper ends are connected by links 111 111 with the folders 107 107, respectively, which are fulcrumed at 107$^a$ at the upper end of the plunger 108, the connection of the links 111 and folders being at a suitable distance outward from the fulcrums of the folders to cause the upward thrust of the links derived through the plungers 110, as hereinafter described, to fold the links upward and toward each other to embrace the horn. The plungers 110 carry at their lower ends abutment rolls 110$^a$, which take into the cam-grooves 112$^a$ and 113$^a$ in the proximate faces of the facing cam-wheels 7 and 113, mounted on the shaft 9 at opposite sides of the cam 9$^b$. The cam-grooves are shaped so as to thrust up the plungers 110 and retract them in proper time for folding and unfolding the folders to round up the can-body about the horn and release it for delivery, as hereinafter more particularly described. In order to prevent the thrust of the plungers 110 by the cams 112ª and 113ª causing the plunger 108 to be lifted or depressed without regard to the form of its controlling-cam 9ᵇ and also to provide means to insure its retraction downward, said plunger 108 is provided with an arm 108ᵇ, which reaches around the cam 9ᵇ and at a point below the cam carries a short plunger 108ᶜ, thrust upward by a spring 108ᵈ reacting between said plunger and a plug 108ᵉ set through the lower end of the arm 108ᵇ, and carrying at the upper end a roll 108ᶠ, which bears against the cam 9ᵇ at a point diametrically opposite to the bearing of the roll 108ª. The spring 108ᵈ permits the plunger 108ᶜ to be forced back in its socket when the rotation of the cam requires the rolls 108ª and 108ᶠ to be spread; but said spring is sufficiently strong to prevent any frictional lifting action of the plungers 110 on the plunger 108.

The operation of the devices for closing up the can-body and engaging and clenching the seam is as follows: During the feeding stroke of the feed-bars the horn and folders and the clencher-head and the connected and operating parts stand at rest in the position shown in Fig. 6. The cam 9ᵇ and the cam-grooves 112ª 113ª have circular portions concentric with the shaft 9, operating through this stage upon the abutment-rolls 108ª and 110ª. In this stage it will be noticed that the slide-head 93 is at highest position and the eccentrics which operate it are rotating through the portion of their orbit at which their centers are passing over the axis of the shaft, causing no effective reciprocation of said slide-head, and the cam-groove 103ª is engaged at its lower part by the abutment 102ª of the lever 102, so that the cam-plate 100 on the stem 100ª is at its most forward position and by its engagement with the oblique fingers 99ª of lugs 99 holds the wings 94 of the horn at their most closely-folded or collapsed position. Upon the completion of the feeding movement and the commencement of the retracting movement of the feed-bar the cam 9ᵇ stands with the upraise or slope from the part of the lesser to that of the greater radius at 9ᵉ ready to encounter the roll 108ª, and simultaneously with the commencement of the retracting movement the cam 9ᵇ thrusts upward the plunger 108 and causes the gripper 95 in the upper end of said plunger to grip the blank to the back or under side of the back piece 90 of the horn. At the same time the cam-grooves 112ª 113ª—one a little later than the other, for reasons hereinafter explained—commencing and thereafter continuing to thrust up the plungers 110 and fold the folders 107 up against the blank lying outspread over their extremities (see Fig. 6) carry up the two sides of the blank as they thus fold and wrap them about the horn. Cam-wheels 7 and 113 are set so that the cam-groove of the latter is a little in advance of that of the horn for causing the folder at that side to fold up the side of the blank having the outwardly-turned flange in advance of the other side, so that they may not collide fold to fold, but pass by each other for snapping into engagement. This folding action continues until at the climax or completion of said movement caused by the upthrust of the plungers 110 the two flanges at the edges of the blank are carried past each other and snap into engagement. During the latter part of this folding movement the slide-head 93 has been descending, and by the time the climax of the folding movement is reached, as above described, the abutment-roll on the lever 102 having traversed the lower straight part of the cam-groove 103ª in the bracket 103, which has been descending with the slide-head, passes in the inclined portion of said cam-groove, and while the cam which operates the folders, having passed the climax of its movement, is commencing to retract the folders outward slightly the continued descent of the slide-head 93 and bracket 103 causes said inclined portion of the cam-groove 103ª to draw forward the cam-plate 100, spreading the wings 94 and causing them thus to follow the outward movement of the folders, but more rapidly than the latter, so that they overtake the folders, carrying the two sides of the can-body apart and drawing their interlocked flanges into complete engagement by the time the limit of the spreading movement of the wings is completed by the abutment-roll on the lever 102 traversing the entire length of the inclined portion of said cam-groove. By the time this movement is completed and while the abutment-roll takes the upper straight portion of the cam-groove the slide-head continues to descend and brings the clencher-punch 106 down onto the outer lapped of the flanged edges of the blank and continuing still to descend flattens the flanges one within the other, their change from oblique to flat causing them to slide each at the edge upon the opposed face of the blank and to be thus interlocked as they are flattened. The clencher-die 90ᶜ has a recess 90ᵈ in position on its upper face directly beneath the flanges which are to form the seam, and as these flanges are thus flattened and clenched the entire seam is sunken in the recess 90ᵈ by the continued descent of the clencher-head and the outer surface of the can is left substantially flush, the entire protrusion of the seam being within, as is desirable in order that when the heads of the can are applied their flanges may fit and make perfect contact about the entire circumference. During the clenching process—that is, throughout the completion of the descent of the slide-head 93—the folders and the plunger 108 have been held in the extreme upper position, to which they have been moved by the respective cams, said cams having proper concentric portions to hold them fixed in such position while the seam is clenched and sunken. Upon the completion of this clenching and sinking action the folders are withdrawn by the action of their controlling-cams, and a little later the plunger 108 is also withdrawn. At the same time the continued ascent of the slide-head carrying the bracket 103 and bringing the deflection of its cam-groove 103ª to the abutment-roll 102ª causes the cam-plate 100 to be pushed inward in the back piece of the horn, drawing inward or collapsing the wings 94. The can-body is now free for removal from the horn for withdrawing it simultaneously with the advancing of the next following blank into position under the horn. The feed-bar 21ª, protruding at the delivery side of the machine, is provided with arms 116, having spring-catches 116ª hooked ratchetwise at their forward ends and adapted to pass at opposite sides of the can-body on the horn in the retracting movement of the bar and at the limit of said movement to engage by its hooked ends with the can-body at opposite sides, so that upon the next feeding or rearward movement of the feed-bars it will draw the can-body off from the horn, and said can-body having been released from all detention in the initial part of said feeding movement is thus removed. As the feeding movement proceeds the can-body is drawn off from the horn and drops from between the fingers 116ª into any receptacle or chute that may be provided. The adjustment of the engagement of the lever 102 with the stem 100ª of the cam-plate 100 is designed for the purpose of adapting the horn to operate properly with can-bodies varying slightly in diameter, for it will be understood that the maximum expansion of the horn by the outfolding of the wings must correspond to the inner diameter of the can-body, the range of movement of the wings being sufficient to interlock the flanges, but being performed closer to or farther from the middle section of the horn, according to the adjustment effected by means of the nuts 100ᵇ.

In order to adjust the gripper to accommodate and hold blanks of different thickness, it is mounted with vertical adjustability in the upper end of the plunger 108, (see Fig. 6,) and adjustment is provided for by means of a tapering key 115, (see Fig. 5), set through the plunger and engaged at its exposed hooked end 115ª by the adjusting-screw 117—the screw which is screwed inward and outward for withdrawing and thrusting inward the key to raise or lower the gripper-jaw 95. From the position of this jaw in the middle of the width of the path of the blank it is penetrated by the feed-bar 21ª, (see Figs. 5 and 6,) and the aperture in the gripper through which this feed-bar extends is elongated vertically to allow both for the vertical adjustment of the gripper and for the vertical movement of the plunger 108.

I claim—

1. In a machine for the purpose indicated, in combination with a supporting-frame comprising a table on which the blanks are lodged and advanced; two parallel shafts having equal rotary speed extending transverse to the path of advance; feeding devices and edge-flanging mechanisms actuated by one of said shafts and folding and seam-clenching mechanisms actuated by the other shaft.

2. In a machine for the purpose indicated, in combination with a table on which the blanks are lodged and advanced, flanging mechanisms mounted in the table at opposite sides of the path of the blank; a feeding device comprising parallel bars guided for longitudinal reciprocation in the table and having spring-actuated feeding-teeth at intervals in their length corresponding to the longitudinal space allotted to the flanging devices, and means for reciprocating such bars with a stroke equal to said intervals; a presser overhanging the table between the flanging devices, and detent devices carried by the presser for engaging the upper surface of the blank to prevent its retraction.

3. In a machine for the purpose indicated, in combination with a table on which the blanks are lodged and advanced; feed-bars reciprocating longitudinally in the table and having spring-actuated teeth protruding upward to engage and feed the blanks; an elastically-operating presser overhanging the table; flanging devices mounted in the table at opposite sides of the path of the blank and of the presser comprising a fixed upper frame, and a flexible shoe carried by the frame and facing downward for resting upon the blanks; springs interposed between the frame and shoe and detent devices carried by the presser for engaging the upper surface of the blank to prevent retraction of the latter.

4. In a machine for the purpose indicated, in combination with a supporting-frame comprising a table on which the blanks are lodged and advanced; a feeding mechanism for advancing the blanks; a flanging mechanism comprising a carrier mounted and guided for adjustment transversely to the path of movement of the blanks; mechanism mounted on the carrier for flanging the blank; a shaft on the frame journaled parallel to the movement of adjustment of the carrier having an eccentric extended longitudinally on the shaft, and an element driven by said eccentric for operating the mechanism on the carrier adapted to be moved longitudinally along the eccentric without change of its driving relation thereto, and means for giving the carrier its transverse movement of adjustment with respect to the path of the blanks.

5. In a machine for the purpose indicated, in combination with a frame along which the blanks are advanced; feeding mechanism for advancing the blanks; flanging mechanism comprising carriers mounted upon opposite sides of the path of the blanks, such carriers being movable transversely to such path; means for actuating and guiding them in such transverse movement; actuating devices for said flanging mechanism consisting of eccentrics elongated transversely of the path of the blanks; a shaft by which the eccentrics are rotated, and coöperating connections to the flanging mechanisms respectively from the respective eccentrics slidable longitudinally of the latter.

6. In a machine for the purpose indicated, in combination with a supporting-frame comprising the table on which the blanks are advanced; a flanging mechanism comprising a carrier mounted in the frame and flanging devices mounted in the carrier, such flanging devices comprising a clamping-jaw pivoted on the carrier; a plunger mounted in the carrier for vertical reciprocation; a flanging-rocker and a chair on which it is mounted for its rocking movement, such chair being spring-supported on the plunger; means for stopping the movement of the chair relatively to the carrier in the direction of thrust of the spring which supports the chair, whereby the spring yields during the further movement of the plunger after the chair is thus stopped, the plunger having means engaging the flanging-rocker aside from its fulcrum to rock it about its fulcrum during such further movement of the plunger.

7. In a machine for the purpose indicated, in combination with a supporting-frame comprising a table on which the blanks are advanced, such table having at its lateral edges lower jaws for gripping the blank; flanging mechanisms mounted on the frame at opposite sides of the path of the blank, each comprising a carrier supported on the frame, and flanging devices mounted in the carrier, said devices comprising an upper jaw for gripping the blank pivoted to the carrier; a plunger mounted for reciprocation in the carrier having means for actuating the upper jaw to clamp it toward the lower jaw on the table; a flange-folding device; a support for the same yieldingly mounted on the plunger; a stop on the carrier for the yielding action of said supporting device and means on the plunger engaging said flange-folding device for actuation during the movement of the plunger after the supporting device is stopped.

8. In a machine for the purpose indicated, in combination with the supporting-frame comprising a table on which the blanks are advanced, said table having at its lateral edges fixed jaws for gripping the blanks back of their edges; flanging mechanisms supported on the frame comprising each a carrier mounted on the frame; upper gripping-jaws fulcrumed on such carrier; an element reciprocating vertically in the carrier; a flange-folding device which is carried by such reciprocating element, the means for carrying it comprising two parts mounted on the reciprocating element, one fixed with respect to said element and the other having yielding movement vertically with respect thereto; means for stopping such yielding movement on the carrier after predetermined limit, the flange-folding device having pivotal connection with its said two carrying parts, respectively, at lines at different distances from the vertical plane of the edge to be folded.

9. In a machine for the purpose indicated, in combination with the supporting-frame comprising a table on which the blanks are advanced; a flanging mechanism supported on the frame comprising a carrier which is rigid with the frame; a plunger mounted for vertical reciprocation in the carrier; the table having a fixed lower jaw; an upper jaw fulcrumed on the carrier, one of said jaws being recessed to form a laterally-protruding lip whose surface opposite the gripping-face makes an acute angle with said face; a flange-folding device mounted in the carrier adapted to engage the protruding marginal portion of the blank to fold the same about such protruding lip, and means carried by the plunger for actuating said device in the reciprocation of the plunger.

10. A machine for the purpose indicated, in combination with a supporting-frame comprising a table on which the blanks are advanced; a flange-forming mechanism having its support fixed with respect to the table comprising a carrier mounted on the table; an upper jaw fulcrumed on the carrier, the table having its lateral marginal portion constituting a lower jaw, one of said jaws having a protruding lip whose surface opposite the gripping-face makes an acute angle to said face; a plunger mounted on the carrier, and means for reciprocating it; a flange-folding device having two pivotal supports on the plunger, one fixed and the other yielding with respect thereto, and means on the carrier for stopping the yielding movement while the other movement continues, the folding device having an edge or face which in the movement resulting from such stoppage is rocked against said surface of the protruding lip.

11. In a machine for the purpose indicated, in combination with the supporting-frame comprising a table on which the blanks are advanced; flanging mechanisms supported on the frame at opposite sides of the path of the blank, each comprising a carrier mounted rigidly with respect to the table, said table having at its lateral margins rigid under jaws for gripping the blanks; upper jaws fulcrumed to the carriers respectively; a plunger mounted in each carrier and means for reciprocating the plungers vertically adapted to cause their simultaneous movements to be in opposite directions, said plungers having means which simultaneously by their said opposite movements clamp the upper jaws to the table-jaws; flange-folding devices carried by the plungers respectively, each of said folding devices having two pivotal connections, one fixed with respect to the plunger and the other yielding vertically with respect thereto, the yielding support on one of the carriers being adapted to yield downward with respect to the plunger and the other being adapted to yield upward with respect thereto; stop devices on the carriers respectively for limiting said yielding movement in said opposite directions; the upper jaw of the flanging mechanism comprising the downwardly-yielding folder-support and the lower jaw of the opposite flanging mechanism having a protruding lip over which the flange may be folded at an acute angle to the clamping-face of the jaws, and the folder being adapted in the rocking movement consequent upon the stopping of one of its supports to rock over onto such lip for so folding the flange.

12. In a machine for the purpose indicated, in combination with a supporting-frame comprising the table on which the blanks are advanced, said table having at its lateral margins lower jaws for gripping the blanks; flanging mechanisms at opposite sides of the table comprising each a carrier; upper gripping-jaws fulcrumed on the respective carriers overhanging the table-jaws, the fulcrums being above and outward from the outer edges of the lower jaws, the upper jaws being adapted to grip by swinging downward and outward to the lower jaws (whereby they tend to move outwardly on the surface of the blank in coming to clamping position); plungers mounted in the carriers for vertical reciprocation; means for reciprocating the plungers adapted to make their opposite movements simultaneous, said plungers having means for encountering the jaws in one of their said opposite simultaneous movements to give the jaws simultaneously such outward clamping movement.

13. In a machine for the purpose indicated, in combination with the means for supporting and advancing the blanks, a cross-head overhanging the path of the blanks; a horn about which the blanks may be folded carried by the cross-head; a slide-head having slide-supports outside the path of the blanks and extending across said path overhanging the horn, the horn consisting of a plurality of parts and adapted to be expanded by spreading such parts, the means for expanding the horn comprising a stem which protrudes through the forward end of the horn, a lever fulcrumed on the cross-head and engaging the stem, and the cam-plate, 103, carried by the slide-head and engaging the lever.

14. In a machine for the purpose indicated, in combination with a horn about which the blank may be folded having a fixed member and a member adjustable relatively thereto for expanding the horn; a reciprocating seam-clenching device; means for actuating said adjustable member comprising an element connected therewith mounted on the fixed member and protruding from one end thereof; a cam carried by the reciprocating clenching device; a lever having its fulcrum fixed with respect to the horn engaged by the cam and connected to said protruding element, and means for adjusting it at its connection with said element.

In testimony whereof I have hereunto set my hand, in the presence of two witnesses, at Chicago, Illinois, this 27th day of August, 1904.

HARRY C. H. WALSH.

In presence of—
J. S. ABBOTT,
FREDK. G. FISCHER.